Figure 1:
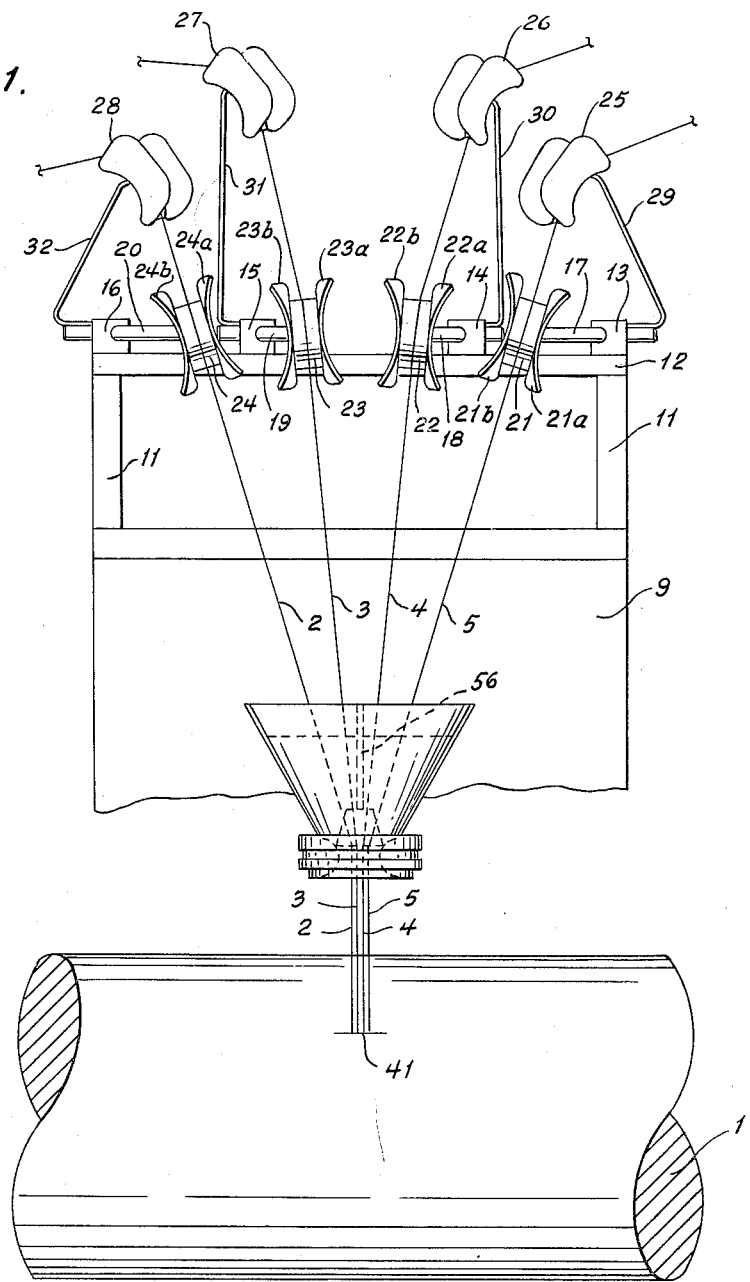

March 13, 1962 R. E. YOUNG 3,025,205
FILAMENT DELIVERY SYSTEMS AND METHODS
Filed Jan. 30, 1958 3 Sheets-Sheet 1

INVENTOR.
RICHARD E. YOUNG
BY
ATTORNEY.

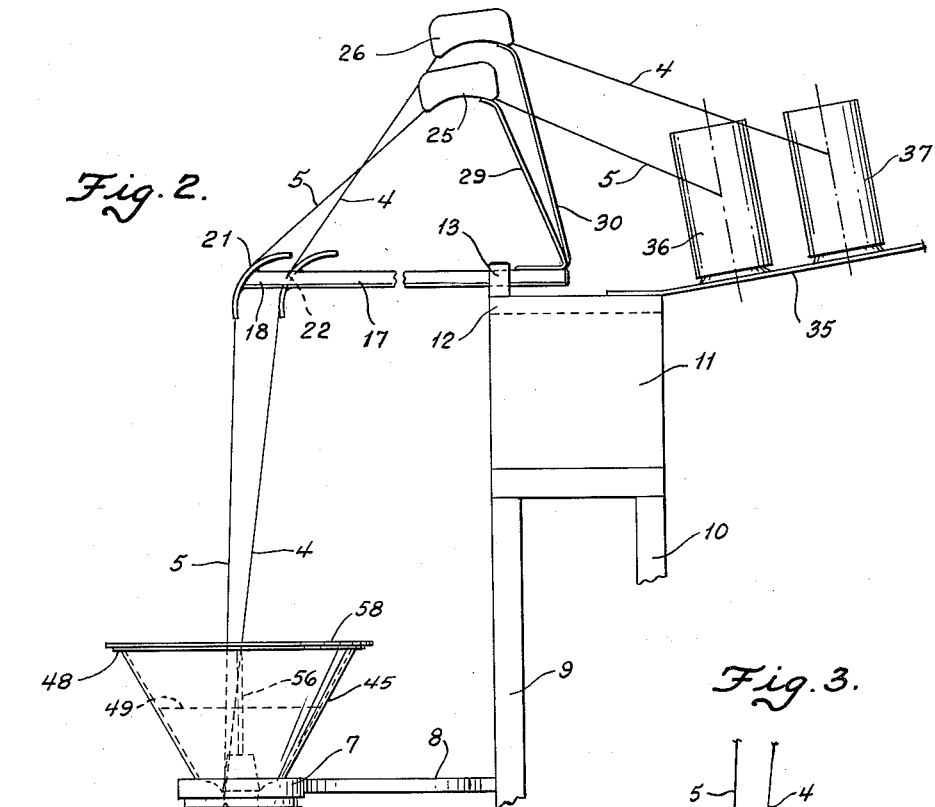
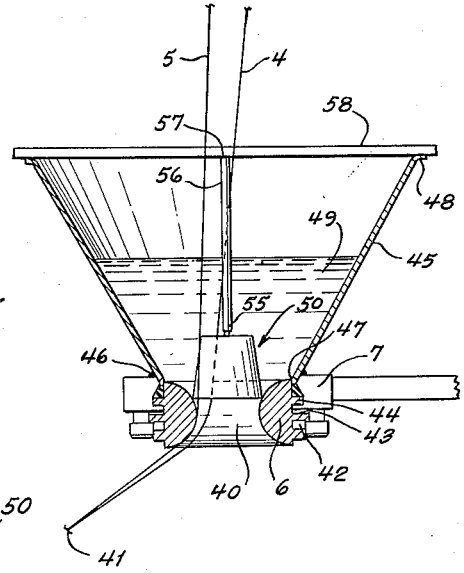
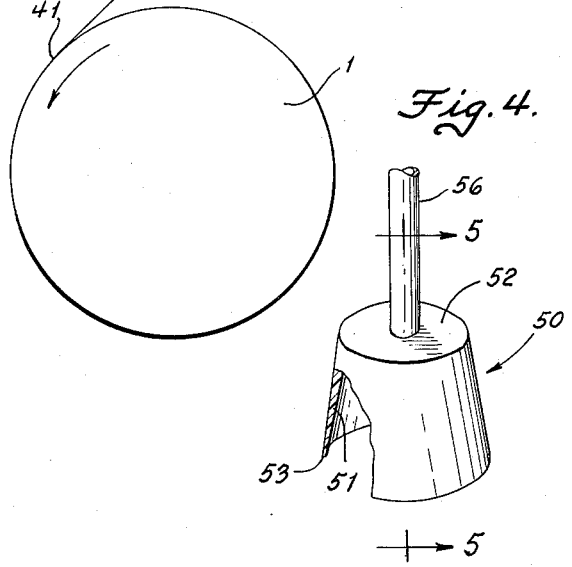

March 13, 1962 R. E. YOUNG 3,025,205
FILAMENT DELIVERY SYSTEMS AND METHODS
Filed Jan. 30, 1958 3 Sheets-Sheet 3
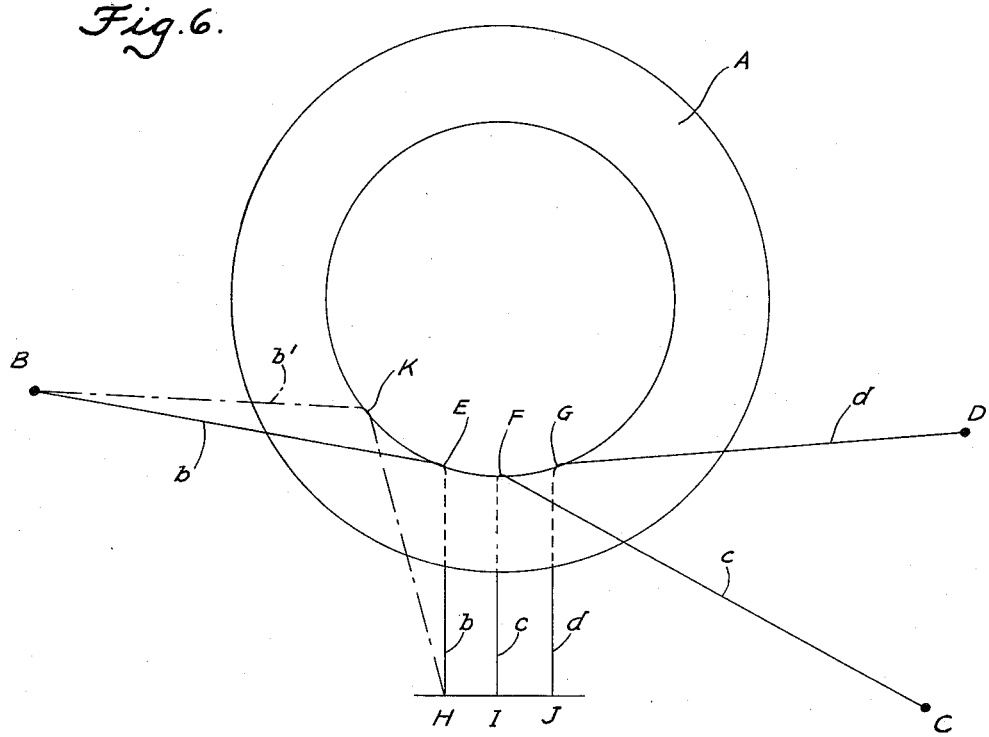
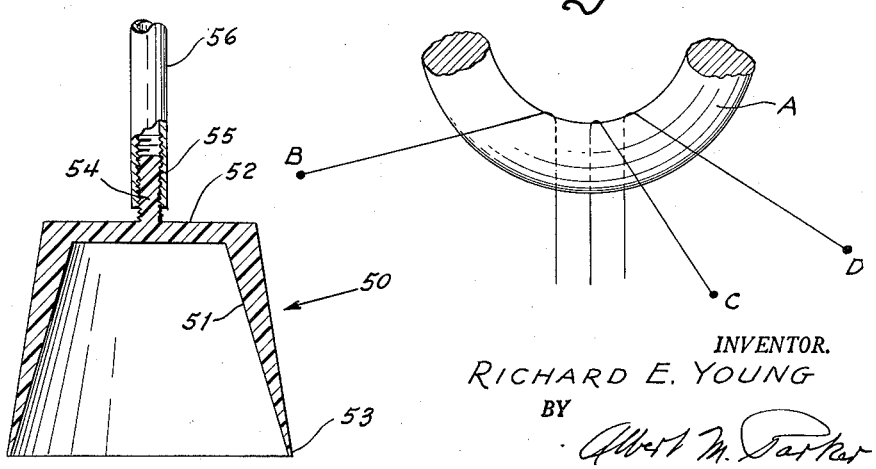
INVENTOR.
RICHARD E. YOUNG
BY
Albert M. Parker
ATTORNEY.

United States Patent Office 3,025,205
Patented Mar. 13, 1962

3,025,205
FILAMENT DELIVERY SYSTEMS AND METHODS
Richard E. Young, Rocky Hill, N.J., assignor, by mesne assignments, to Hercules Powder Company, Wilmington, Del., a corporation of Delaware
Filed Jan. 30, 1958, Ser. No. 712,169
19 Claims. (Cl. 156—169)

This invention relates to filament delivery systems and parts thereof and is particularly concerned with such systems, parts thereof and methods for the delivery of a plurality of filaments to a work surface in predetermined spaced relationship, and in the maintaining of the filaments in that relationship during such delivery. The invention is also particularly concerned with methods and apparatus for applying the desired quantity of bonding resin in fluid form to the filaments as they pass to the work surface.

Heretofore, in passing filaments, having no lateral stability and subject to no pressure from their neighbors, to the work surfaces of work members, of which rotating mandrels are an example, the practice, in order to cause these filaments to arrive at the work surface in proper spaced relation, has been to pass them through different eyes, separators, or combs. The best of these spacing means have tended to chafe or wear the filaments and, without necessarily breaking them, would fray them so as to introduce imperfections into the product. Furthermore, when any foreign matter, such as glass slivers, is carried to any of such spacing means, it starts a build up which can clog up the passageway for the filament and stop the whole run. Breakage of filaments can also occur in the feeding of the filaments through eyes, combs, or other separators.

In addition, such separated feeding renders it difficult to apply uniform coatings of suitable resins or other adhesives to the filaments. This, in turn, renders it difficult to maintain uniformity of the ultimate product.

The apparatus and method of the invention eliminate the foregoing and other drawbacks of the prior art practices and improves upon the same to a marked degree. Filaments delivered in accordance with the invention. without being confined as by means of an eye or guide, have nothing to chafe or break them, but will nevertheless arrive at the work in the desired spaced relationship. Even if that relationship is disturbed, it will quickly restore itself.

The filaments are coated with the desired resins or other adhesive material as they put in their parallel paths, while the uniformity of that coating from filament to filament is readily controlled. Any foreign matter, such as separate slivers of glass are picked up by one or more of the filaments and carried right along to the product where they belong in the first place. Clogging is eliminated.

A single unitary member serves as a closure for the adhesive pool and a controller for the uniform application of adhesive to the filaments in the quantity desired.

It is, accordingly, a principal object of the invention to provide improvements in filament delivery systems in apparatus for forming elements out of a multiple of filaments.

Another object is to provide such improvements incorporating unconfined delivery of the filaments to the work surface.

Another object is to provide such improvements incorporating uniform coating of the filaments with desired adhesive.

Other objects are to eliminate chafing of filaments while traveling to the work surface and to prevent clogging of the path of travel.

Further objects will be apparent in light of the accompanying disclosure and claims.

In accordance with the invention, a method is provided for delivering coated filaments to a work surface in spaced parallel relationship which comprises transporting a plurality of filaments from separated positions in space in converging relation toward a single toroidal inner surface, engaging said filaments with said toroidal inner surface in spaced relationship with respect to each other, and leading said filaments through atmospheric space from said toroidal inner surface directly to said work surface, and when desired, adjusting the said positions in space with respect to each other to provide the desired spacing between the filaments. In a preferred embodiment, the filaments are coated as they approach the said toroidal inner surface, and the quantity of coating material carried by the filaments past the toroidal inner surface is controlled in the course of their passage by the said toroidal surface.

Further in accordance with the invention, a filament delivery system is provided which comprises means providing a plurality of filaments converging from angularly spaced positions, means for converting said plurality of converging filaments into a band of parallel filaments, the last said means comprising a ring member which is formed with an internal toroidal filament engaging surface, and a work surface to which said band of filaments is passed from said ring member, said work surface being separated from said ring member by an atmospheric space. In a preferred embodiment, the filament delivery system comprises a combined coating head and filament delivery member; a chamber in the coating head for receiving a pool of adhesive, said coating head being formed with an outlet end for said chamber; means forming part of said delivery member for controlling the direction of filaments passed through said pool and out of said outlet end; means for controlling the amount of adhesive carried from said coating head past said delivery member by said filaments, the last said means including a yieldable resilient member having an extending portion engaging said direction-controlling means; and a work surface to which said coated filaments pass from said direction-controlling means, and said work surface being separated from said direction-controlling means by an atmospheric space.

The invention is further illustrated with reference to the drawings of which FIG. 1 is a schematic elevation of a system in accordance with the invention; FIG. 2 is an end elevation thereof as viewed from the right hand end in FIG. 1, certain parts being eliminated in the interest of clarity; FIG. 3 is an enlarged sectional view of the combined coating head and delivery ring of the invention; FIG. 4 is a fragmentary perspective view, partly in section, of the plug member for such coating head; FIG. 5 is an enlarged section thereof; FIG. 6 is an enlarged top plan diagrammatic view of a delivery ring in accordance with the invention, illustrating the theory of operation thereof; and FIG. 7 is a fragmentary perspective view of such delivery ring.

Still another object is to provide improvements in methods for the delivery of filaments for the forming of elements on a work surface.

A further object is to provide valve means for the maintaining of a pool of adhesive while permitting the passage therethrough of filaments coated by such adhesive.

A further object is to provide improvements in methods for controlling the application of adhesive to filaments while delivering the filaments to a working surface for the forming of a product.

Still further objects are to provide for the high speed delivery of filaments in a simplified manner to a working surface for receiving the same.

Considering the invention in connection with the forming of elements by winding filaments on to a mandrel, such a mandrel is illustrated at 1 in FIGS. 1 and 2. The rotation thereof is shown by the arrow in FIG. 2 as being in counter clockwise direction. The plurality of filaments, 2, 3, 4 and 5 are here shown as being drawn through a unitary delivery ring 6 (FIG. 3). The ring 6 is suitably carried by a ring mounting member 7 which is in turn carried by a ring arm 8 mounted on the forward member 9 of the machine carriage members 9 and 10. The latter members form part of the carriage which reciprocates longitudinally of the mandrel to deposit fibres thereon.

A bracket having spaced sides, 11, 11, extends upwardly from the carriage members 9 and 10 to a transverse top 12. Slipper supports 13, 14 15 and 16 are mounted on and secured to the forward part of the bracket top 12 and are bored for the adjustable reception of the slipper bars 17, 18 19 and 20. These supports 13, 14, 15 and 16 are preferably in the form of split rings whose split is closed by means of clamping bolts screwed into the top 12. The supports are pivotable in toto into the bolts until they are tightened down against the top 12. Also the slipper bars 17—20 may be turned in the supports and be slid longitudinally therein until the clamping bolts are tightened to prevent it. Thus a wide range of positioning of the slippers 21—24 is provided for. They can be moved in and out by the movement of the supporting bars; they can be rotated about the axis of those bars so as to tilt them into the various positions as illustrated in FIG. 1; and they may be swung about centers determined by the axes of the clamping bolts. The details of this mounting have been omitted from the drawing for the sake of clarity.

In FIG. 1 the slippers (21—24) are shown as equipped with pairs of upstanding opposed side guides 21a—21b, 22a—22b, 23a—23b and 24a—24b respectively. These are shown as suitably curved and formed to maintain the filaments on the slippers in the event that they are in any manner caused to move sidewise on the slipper surfaces. Such side guides have been omitted from the showing in FIG. 2 in order to facilitate illustration of the manner in which the filaments engage and pass over the slippers.

For retaining the filaments under uniform tension, they are engaged in their passage to the slippers by suitable tensioning means, here illustrated as tensioning guides 25, 26, 27 and 28. These are respectively carried by spring arms 29, 30, 31 and 32, in turn mounted on the rear protruding ends of the slipper bars 17—20.

The top 12 of the bracket 11 also carries a rearwardly extending spool support 35, which as shown in FIG. 2, carries spools 36 and 37 of filament material for the filaments such as 4 and 5. Only two of these spools and two of the slippers, slipper bars and guide means are illustrated in FIG. 2, since the other two spools needed to supply the other two filaments of FIG. 1 would lie right behind spools 36 and 37. Likewise the slippers 23, 24, the slipper bars 19 and 20, and the guide means 27 and 28 have been omitted from the FIG. 2 showing, since with the system properly adjusted, they lie right behind the two shown in FIG. 2. The spools 36 and 37 are mounted for axial rotation on the spool support 35. The showing of spools has been eliminated entirely from the FIG. 1 form, as it is not believed necessary for an understanding of the invention. It is quite apparent that filamental elements wound up on spools can be readily supplied in the desired number in the manner shown in FIG. 2 and can be directed as shown in FIGS. 1 and 2 to a suitable delivery ring 6.

The rotation of the mandrel 1 serves to draw the filaments from their spools and variations in the tension of the filaments so supplied is resiliently compensated for by the action of the resilient guiding means 25—28. Also, it is to be understood that though four filaments have been illustrated in FIG. 1, two of them being shown in FIG. 2, this number is merely for illustrative purposes. A greater or smaller number may be applied if desired.

It is further to be understood that through the elements 2—5 have heretofore and will hereinafter be referred to as "filaments" this is merely for facilitating the description and is not to be interpreted in a limiting sense. Instead, wherever the term "filament" is used, it is to be understood that the member, rather than being an elemental single strand, may be made up of a plurality of strands and may be of various cross-sectional shapes rather than having the normal circular cross-sectional shape of a mere filament. Also, the strands of composite members, or the various strands of a group being wound, may be of the same or of different materials as desired or required.

Considering now an essential feature of the invention, attention is first directed to the showings in FIGS. 6 and 7 for the illustration of the theory on which filament delivery in accordance with the invention is based. Here a toroidal member A completely circular in cross section, as seen from the FIG. 7 showing, is shown as having its surface engaged by a plurality of filaments directed thereto from points in space, such as B, C and D. Filaments extending through space when under tension will follow the shortest path possible. Thus, if the converging filaments from the positions B, C and D were passed over a bar, they would merely continue to converge. When, however, they are passed over a toroidal surface, such as that of the member 12, they will take the path involving the least amount of material, or the least distance, from their beginning point to their terminating position. Hence, in the present situation, it is merely necessary to adjust the beginning points B, C, and D of the filaments b, c, and d, to cause the filaments to naturally engage the toroidal surface of the member A at equal, or other desired, spaced positions, such as E, F and G. Then, so long as the work is running, the terminal points H, I and J where the filaments b, c and d engage the work surface will remain the same distance apart as the spacing of the filaments where they engage the ring.

The dot-dash line b' engaging the toroidal surface at the point K has been introduced to illustrate what happens when the shortest path of the filament is disturbed. Assume then that the filament b is moved into a position where it follows the path b' with the point E becoming the point K, with the work still moving. Once the action moving the filament into the bath b' is removed, the point K will immediately jump back to the point E and the filament will return to its normal path b.

By the application of this principle, the elimination of individual separators, such as eyes or combs, at the point of the delivery is effected. By properly angularly directing the filaments to a properly positioned toroidal surface the band running therefrom to the work surface can be established with uniformity and will remain so. The absence of separators greatly facilitates the functioning of the delivery system. It simplifies the structure of the functioning elements. Chafing or other disturbance of the filaments is eliminated. Clogging is eliminated. The application of adhesive to the filaments is simplified and made uniform. In the over all, the invention simplifies the formation of a uniform band delivered to the work properly impregnated with the adhesive. These things are of particular significance when the strands of the band are to be delivered to the mandrel at a wide range of helix angles. In the embodiment illustrated, a mere circular winding is illustrated, but the formation of various types of conduits and vessels shown in applicant's copending applications, Serial No. 699,077 and Serial No. 374,600, now Patent No. 2,843,153, calls for the delivery of the filament at a wide range of helix angles. The formation of those items is simplified by employing the delivery arrangement just described.

Considering the application of those principles to the form of apparatus here embodying the invention, it will be seen that the ring 6, as best shown in FIG. 3, has a toroidal innersurface 40 which is engaged by the filaments 4 and 5 as they pass from their slippers to the tangent position 41 on the mandrel 1. Obviously, from what has just been pointed out, the positions in space of the slippers 21, 22, 23 and 24 will determine the relationship of the filaments 2, 3, 4 and 5 as they pass from a surface, such as 40, to the tangent position 41. The adjustability of the slippers enables the width of the resultant band to be adjusted over a substantial range, limited only by the size of the ring 6.

For best results the ring 6 should be made of metallic material softer than the glass or other filaments being wound. A good example of material to use, when the filaments being wound are formed of glass, is lead bearing mild steel, also known as free machining mild steel. This will wear in time but the ring can be turned to new places so has a long usable life.

The ring member 6 and ring support 7 have suitable interengaging portions to mount them together. These take the form of interlocking tongue and groove formations 42, 43 and 44. A funnel member 45 is secured in suitable manner to the upper portion of the support 7 at its upper end. Such securing is here illustrated as being by means of the weld 46. The smaller end of the funnel 45 is so proportioned as to seat against the outer surface of the ring member 6 at the position 47. The extent and divergence of the funnel 45 to its top 48 is such as to enable it to hold a suitable quantity of adhesive 49 and to enable the filaments to pass down through that adhesive in extending from their slippers to the surface 40.

Another important aspect of the invention is concerned with a manner and means by which the adhesive 49 is retained within the funnel 45 while still permitting the filaments to pass through the adhesive, be coated thereby and pass out through the bottom of the funnel without allowing leakage of adhesive. This is accomplished by the use of a plug-like member, generally indicated at 50, which seats down within the funnel 45 and engages the toroidal surface 40 of the ring 6. This member is preferably formed of some suitable plastic material having reasonable yieldability, resisilence, and toughness, of which polyethylene is a good though not limiting, example.

As best shown in FIGS. 4 and 5, the member 50 is in the form of an inverted bell having a side wall 51 and a base 52. The side wall preferably tapers downwardly from its thickest position where it joins the base 52 to a feather edge at 53 where it engages the surface 40. The manner of engagement of the edge and possibly part of the side wall 51 with the surface 40 controls the quantity of adhesive carried by the filament as well as preventing the adhesive 49 from leaking out from the bottom of the funnel 45. If, for instance, the plug is pushed well down into the ring 6 where the diameter of the opening therethrough is at a minimum, the edge 53 will be contracted. Thus it will more tightly embrace the filaments as they pass by and keep the quantity of resins carried thereby at a minimum. Conversely, if the edge 53 engages the surface 40 above, or even below, the minimum diameter of the opening, the contraction of the side wall will be less, the filaments will be able to pass more freely and they will be able to carry more adhesive with them.

Provision for this adjustable positioning of the plug 50 is incorporated in the means for mounting it in the funnel 45. This means, as here shown, consists of a mounting stem 54, integral with the top 52 of the plug. This stem is externally screw threaded and is received within the internally screw threaded end 55 of the mounting tube 56. At its upper end the mounting tube 56 is mounted at the position 57 midway of a cross bar 58 which extends across and overlies the open end 48 of the funnel. A reasonable range of adjustment can be effected by the screw threaded engagement at 54—55. Other means might obviously be used for securing the plug 50 to the tube 56 and for effecting vertical adjustment of the plug. One of these is to incorporate such adjustment means in the connection between the tube 56 and the cross bar 58.

The apparatus and method of the invention have greatly simplified and facilitated the provision of adhesive coated filaments for the forming of elements by winding operations. The proper parallel relation of the filaments is easily obtained and maintained by the passing of the same from properly selected points in space to the surface of the torus on the way to the work surface. The particular funnel and plug arrangement, when used in conjunction with the torus, enables an effective pool of adhesive to be maintained while the plug, in addition to serving as the bottom closure for the funnel, serves as the gate means for the passage of the filaments from the adhesive pool to the work and, more particularly, serves as the control means for controlling the quantity of adhesive carried by the filament and for maintaining that quantity uniform.

Since certain changes in carrying out the above method and in the constructions set forth, which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. In filament delivery systems, means providing a plurality of filaments converging from angularly spaced positions, means for converting said plurality of converging filaments into a band of parallel filaments, the last said means comprising a ring member which is formed with an internal toroidal filament engaging surface, and a work surface to which said band of parallel filaments passes from said ring member, said work surface being separated from said ring member by an atmospheric space.

2. In a filament delivery systems as in claim 1, said toroidal surface including substantially one-half of the cross sectional perimeter of said ring.

3. In a fiament delivery systems as in claim 1, said ring being formed of metallic material softer than the material of the filaments being engaged therewith.

4. In filament delivery systems, a combined coating head and filament delivery member, a chamber formed in said coating head for receiving a pool of adhesive, said coatiig head being formed with an outlet end for said chamber, means forming part of said delivery member for controlling the direction of filaments passed through said pool and out of said outlet end, means for controlling the amount of adhesive carried from said coating head past said delivery member by said filaments, said last named means including a yieldable resilient member having an extending portion engaging said direction-controlling means, and a work surface to which said coated filaments pass from said direction-controlling means, said work surface being separated from said direction-controlling means by an atmospheric space.

5. In filament delivery systems as in claim 4, said direction-controlling means including a toroidal surface formed at said outlet end of said coating head.

6. In filament delivery systems as in claim 4, said yieldable resilient member comprising an inverted bell-shaped member formed of polyethylene.

7. In filament delivery systems, a receptacle for coating adhesive formed with an opening in the bottom thereof, means surrounding said opening for controlling the direction of coated filaments passed through said receptacle, said surrounding means being formed with a convex toroidal surface bordering said opening, means for controlling the amount of adhesive carried from said receptacle by said filaments, said means including a yieldable resilient member formed with an outwardly inclined portion, said portion yieldably engaging said toroidal surface, and a work surface to which said coated filaments pass from said direction-controlling means, said work surface being separated from said direction-controlling means by an atmospheric space.

8. In filament delivery systems as in claim 7, said yieldable resilient member being formed as an inverted bell, the mouth of said bell being in engagement with said toroidal surface, the engagement of said bell and said surface providing for filaments passing between the two.

9. In filament delivery systems as in claim 8, the wall of said bell adjacent said mouth tapering down to a feather edge.

10. In filament delivery systems, a delivery eye, guide means for guiding filaments running from a plurality of angularly disposed positions in space to said delivery eye, said delivery eye being formed with a unitary directing surface for engagement by all of said filaments, said surface being formed to convert filaments arriving on paths angularly related into a band of parallel filaments, and a work surface to which said band of parallel filaments pass from said delivery eye, said work surface being separated from said delivery eye by an atmospheric space.

11. In filament delivery systems, a delivery eye, guide means for guiding filaments running from a plurality of positions in space to said delivery eye, and a mandrel for receiving said filaments, said delivery eye being formed with a unitary directing surface for engagement by all of said filaments, said surface being curved in two directions to convert filaments arriving on converging paths into a band of parallel filaments and to direct said band with said filaments in said parallel relationship onto said mandrel, said mandrel being separated from said delivery eye by an atmospheric space.

12. In filament delivery systems as in claim 10, said surface being toroidal.

13. A plug member for controlling the flow of fluid material from the coating head of filament delivery systems, said plug member being formed as an inverted bell having a side wall formed of yieldable resilient material, said side wall tapering downwardly from the top to substantially a feather edge at the bottom thereof, said plug member having incorporated in the top thereof means for mounting the plug member in a coating head.

14. A plug member as in claim 13 and said side wall being formed of a plastic material.

15. A plug member as in claim 13, said plug member being formed as a unitary one-piece member made out of polyethylene.

16. The method of delivering coated filaments in spaced parallel relationship onto a work surface which comprises, transporting a plurality of filaments from angularly spaced positions in converging relation directly onto a single toroidal inner-surface, leading said filaments through the air from said toroidal inner-surface to said work surface and adjusting said positions in space with respect to each other to provide the desired spacing between the filaments.

17. The method as in claim 16 and including, coating said filaments as they approach said toroidal inner-surface and controlling the quantity of coating material carried by said filaments past said toroidal inner-surface in the course of their passage by said inner-surface.

18. The method of delivering coated filaments in spaced parallel relationship to a work surface which comprises, transporting a plurality of filaments from separated positions in space in converging relation toward a single continuous toroidal inner-surface, engaging said filaments with said toroidal inner-surface in spaced relationship with respect to each other, and leading said filaments through the air from said toroidal inner-surface directly to said work surface.

19. The method as in claim 16 and including, passing said filaments through a bath of coating material as they approach said toroidal inner-surface and flexibly and yieldably contacting said filaments about the surfaces of the same free of said toroidal inner-surface, as they engage said toroidal inner-surface, to control the quantity of coating material carried by said filaments past said toroidal inner-surface.

References Cited in the file of this patent

UNITED STATES PATENTS

| | | |
|---|---|---|
| 18,461 | Lister | Oct. 20, 1857 |
| 272,660 | Cowles | Feb. 20, 1883 |
| 2,480,358 | Curtis et al. | Aug. 30, 1949 |
| 2,678,676 | Slovin | May 18, 1954 |
| 2,699,415 | Nachtman | Jan. 11, 1955 |
| 2,723,215 | Biefield et al. | Nov. 8, 1955 |
| 2,751,320 | Jacobs et al. | June 19, 1956 |
| 2,767,519 | Bjorksten | Oct. 23, 1956 |
| 2,792,324 | Daley et al. | May 4, 1957 |
| 2,816,595 | Hudak | Dec. 17, 1957 |
| 2,887,721 | Blanchi et al. | May 26, 1959 |